United States Patent [19]
Ogiwara et al.

[11] 4,179,237
[45] Dec. 18, 1979

[54] METHOD FOR CONTROLLING THE OPERATION OF A FLUID MACHINE IN SPINNING RESERVE

[75] Inventors: Kenzyu Ogiwara; Hisao Inoue; Susumu Naganuma, all of Hitachi, Japan

[73] Assignee: Hitachi, Ltd., Tokyo, Japan

[21] Appl. No.: 840,727

[22] Filed: Oct. 11, 1977

[30] Foreign Application Priority Data

Oct. 8, 1976 [JP] Japan ............... 51-120387

[51] Int. Cl.$^2$ .......................................... F01D 19/00
[52] U.S. Cl. ............................... 415/1; 415/110; 415/175
[58] Field of Search ................ 415/1, 110–112, 415/175

[56] References Cited

U.S. PATENT DOCUMENTS

| | | | |
|---|---|---|---|
| 3,238,534 | 3/1966 | Hartland | 415/1 |
| 3,658,436 | 4/1972 | Oishi et al. | 415/1 |
| 3,890,059 | 6/1975 | Takase | 415/1 |
| 3,945,754 | 3/1976 | Hagiya | 415/1 |
| 3,985,464 | 10/1976 | Hachiya et al. | 415/1 |
| 4,073,594 | 2/1978 | Takagi et al. | 415/1 |

FOREIGN PATENT DOCUMENTS

| | | | |
|---|---|---|---|
| 45-34722 | 11/1970 | Japan | 415/1 |
| 44-26002 | 6/1969 | Japan | 415/1 |
| 46-39007 | 1/1971 | Japan | 415/1 |
| 46-39172 | 6/1971 | Japan | 415/1 |

*Primary Examiner*—Everette A. Powell, Jr.
*Attorney, Agent, or Firm*—Thomas E. Beall, Jr.

[57] ABSTRACT

Prior to bringing a fluid machine to the condition of spinning reserve for practicing a phase modifier operation or for producing a so-called standby condition which permits immediate switch-over to a power-generating or pumping-up operation, the water level in a runner chamber is forced down by supplying compressed air, and then the runner is driven to rotate in compressed air atmosphere. In this process, the water in a casing is gradually discharged at a rate which is commensurate with the rate of supply of the compressed air so as to thereby prevent leaking of the water in the casing from a guide vane.

5 Claims, 2 Drawing Figures

METHOD FOR CONTROLLING THE OPERATION OF A FLUID MACHINE IN SPINNING RESERVE

LIST OF PRIOR ART REFERENCES [37 CFR 1.56(a)]

The following references are cited to show the state of the art:

U.S. Pat. No. 3,658,436 to Oishi et al, Mar. 6, 1970 (Cl. 415/1, 415/13).

U.S. Pat. No. 3,890,059 to Takase et al, Oct. 23, 1973 ( Cl. 415/1, 415/106, 415/500).

Japanese Patent Publication No. 26001/1969, Koichi Nakanishi, Apr. 9, 1966 (Cl 52b2).

Japanese Patent Publication No. 15566/1970, Akira Ito, Dec. 30, 1966 (Cl 52b2).

BACKGROUND OF THE INVENTION

This invention relates to methods for controlling the operation of a fluid machine in spinning reserve for practicing a phase modifier operation or for producing a so-called standby condition which permits immediate switch-over to a power-generating or pumping-up operation, and more particularly to a method of the type described which has the effect of avoiding accidents due to a rise in the temperature of the fluid machine.

In a fluid machine, such as water turbine or reversible pump water turbine, which is connected directly to a synchronous generator, a so-called phase modifier operation is practiced for improving the power factor of the transmission system when such factor is lowered. In practicing the phase modifier operation, the water level in a runner chamber is forced down and the guide vane and inlet valve are fully closed to rotate the runner in compressed air atmosphere by introducing compressed air into the runner chamber. When a fluid machine practices such pattern of operation, the fluid machine is said to be in spinning reserve condition. A fluid machine is also brought to the condition of spinning reserve for producing a standby condition which permits immediate switch-over of the fluid machine to a power-generating operation. A fluid machine may remain in the spinning reserve condition for several hours to several scores of hours.

A method of the prior art for operating a fluid machine in the spinning reserve condition will be described in detail. The guide vane and inlet valve are fully closed and the water level in the runner chamber is forced down by introducing compressed air thereinto, so as to rotate the runner in compressed air atmosphere. Inasmuch as the inlet valve is fully closed, water leakage from the guide vane causes a reduction in the hydraulic pressure in the casing, thereby permitting the air in the runner chamber to be introduced into the casing. In order to prevent a reduction in the hydraulic pressure in the casing, a valve mounted in a line connecting the casing to a penstock on the upstream side of the inlet valve for supplying water to compensate for the leakage of water from the guide vane is opened to supply water to the casing, so as to maintain the pressure within the casing at a level which is slightly higher than the pressure within the runner chamber. It is for the purpose of preventing damage to an intake and a screen or the like arranged at the intake which would be caused by the explosion of air flowing upwardly through the penstock from the casing when a pumping-up operation is initiated or the fluid machine is switched to a power-generating operation from a standby condition, that the introduction of air into the casing is prevented.

Since the pressure within the casing is higher than the pressure within the runner chamber, water leaks slightly from the guide vane. Also, a seal provided between the outer circumferential surface of the runner and fixed parts has a gap which is small in size, so that cooling water is supplied from a device specially provided for that purpose to the outer circumferential surface of the runner to prevent heating thereof. As a result, a wall of water is formed around the outer circumferential surface of the runner due to collection of such water. If the runner is rotated in compressed air atmosphere under such condition, blades of the runner will vigorously stir up the water therearound. This will increase an input to the shaft required for rotating the runner in compressed air atmosphere and impart energy of a high value to the water. Part of the energy will raise the temperature of the water around the runner, part thereof will be dissipated to the surroundings by heat transfer, and the remainder will be released to outside by the leakage water discharge through a leakage water discharge pipe. When the runner rotates in compressed air atmosphere in the spinning reserve condition, the temperature of the water around the runner rises as aforesaid. No serious problems are raised so long as the period of time for spinning reserve of the fluid machine is short. However, prolonged holding of the fluid machine at spinning reserve condition causes a great rise in the temperature of the water. In particular, even if a method is used whereby the difference between the pressure within the casing and the pressure within the runner chamber is minimized for reducing the amount of water leaking from the guide vane when a fluid machine is placed in spinning reserve condition, there are limits to the quantity of water discharged through the leakage water discharge pipe, and it is impossible to raise the quantity of discharged leakage water to a very high level. Thus, prolonged holding of the fluid machine at spinning reserve condition results in gradual collection of water around the runner after such water leaks from the inlet valve or the guide vane. This means an increase in the power required for driving the runner to rotate the same and an increase in the value of energy imparted to the water around the runner, thereby greatly raising the temperature of the water.

If the water around the runner has a very high temperature, the runner will undergo a high degree of thermal expansion and will be brought into contact with the fixed parts during its rotation. Thus an accident will occur involving the scraping of the surrounding parts by the runner which will cause damage to the rotor. Moreover, since the power required for rotating the runner is high, there will be a loss of energy and the efficiency of operation of the power plant will be reduced. If it is desired to reduce to zero the quantity of water leaking from the guide vane, the end can be attained by fully closing the inlet valve and discharging water from the casing by using compressed air to fill the casing with compressed air in the same manner as the runner chamber is filled with compressed air. However, this proposal will be impracticable, because the casing has a volume which is about three times as large as that of the runner chamber and the quantity of compressed air required for discharging water from the casing will be immense. This means that water level forcing down equipment and a compressed air producing device will have to be of a very great size, causing an increase in the size of a power generating plant. In an underground type generating plant used in a pumping-up power plant system, the earth excavated will increase in volume and cause a fatal blow to this type of power plant system from the economical point of view.

SUMMARY OF THE INVENTION

An object of this invention is to provide a method for controlling the operation of a fluid machine in spinning reserve condition which is economical and enables expansion of the runner due to a rise in temperature to be prevented while the fluid machine is in the spinning reserve condition.

Another object is to provide a method for controlling the operation of a fluid machine in spinning reserve condition which permits water in the casing to be discharged so as to reduce the quantity of water leaking from the guide vane to zero by using water level forcing down equipment of the same size as has hitherto been used without requiring to use equipment of a larger size, and which requires power of a small value for rotating the runner in the spinning reserve condition without causing a rise in the temperature in the runner chamber, thereby making possible safe operation of the fluid machine in the spinning reserve condition.

The outstanding characteristic of the invention is that, in order to obviate the aforementioned disadvantages of the prior art method, the water level in the runner chamber is forced down by introducing compressed air thereinto prior to bringing the fluid machine to spinning reserve condition, and then the runner is rotated in compressed air atmosphere while the water in the casing is gradually discharged therefrom at a rate commensurate with the rate of supply of the compressed air.

DESCRIPTION OF THE PREFERRED EMBODIMENT

The present invention will now be described with reference to a preferred embodiment shown in the accompanying drawings.

Figure 1:
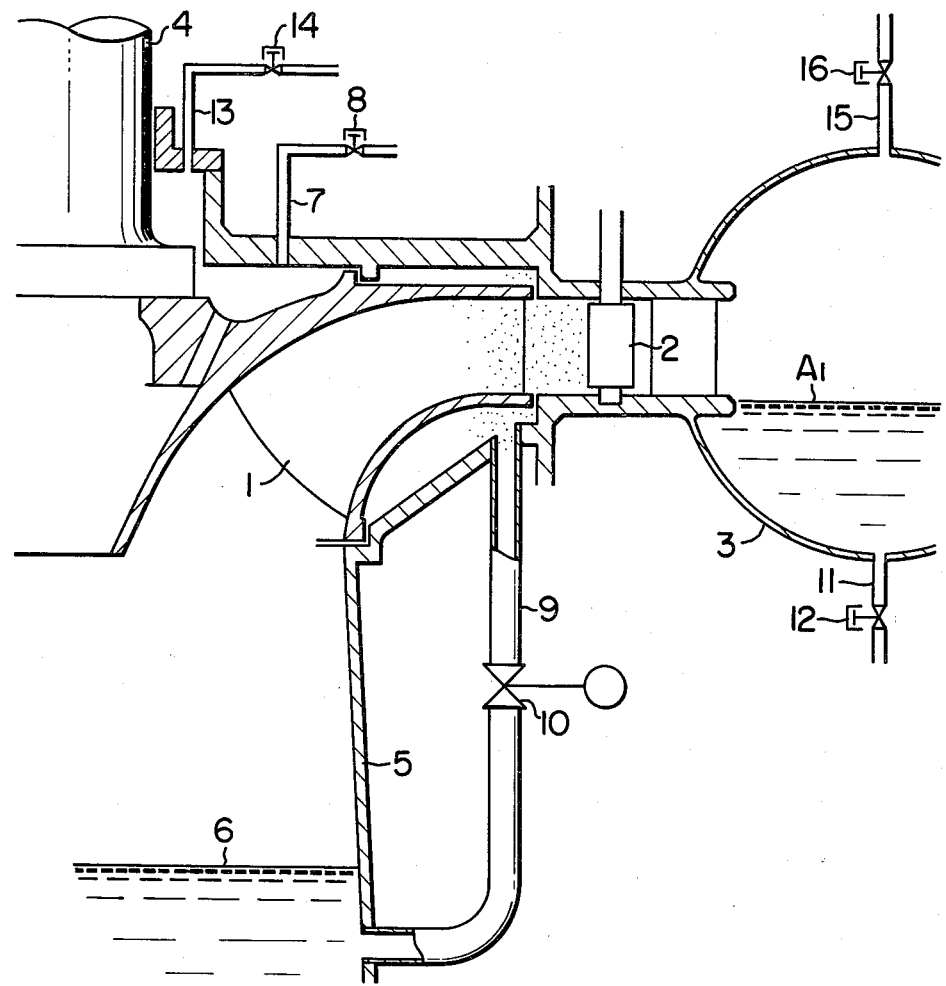
FIG. 1 is a sectional view showing the essential portions of a fluid machine adapted to carry the method according to the invention into practice.

In FIG. 1, the reference numeral 1 designates a runner; 2, guide vanes; 3, a casing; 4, a main shaft directly connected to a generator-motor (not shown); 5, a draft tube; 6, a water level forced downwardly by compressed air; 7, an air supply line connected to a compressed air tank (not shown); 8, an air supply vale; 9, a leakage water discharge pipe; 10, a leakage water discharge valve; 11, a pipe for discharging water from the casing 3 opening in atmosphere or connected to the draft tube 5; 12, a valve mounted in the pipe 11 for discharging water from the casing 3; 13, a line for exhausting air from a runner chamber; 14, a valve mounted in the line 13 for exhausting air from the runner chamber; 15, a line for exhausting air from the casing 3; and 16, a valve mounted in the line 15 for exhausting air from the casing 3.

Figure 2:
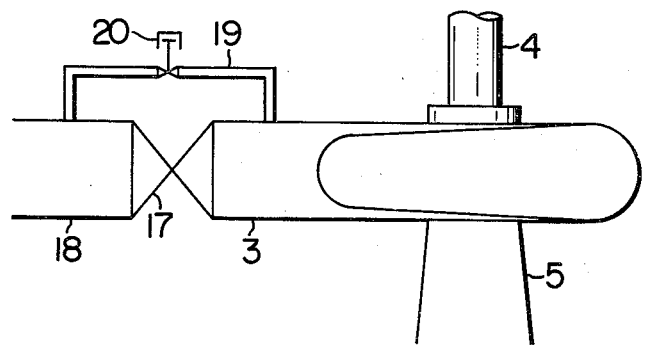
FIG. 2 is a schematic view of the fluid machine of FIG. 1 as a whole.

In FIG. 2, the numeral 17 designates an inlet valve; 18, an iron penstock connecting a dam (not shown) to the fluid machine which is a water turbine in this embodiment; 19, a pipe for supplying water to compensate for the leakage of water; and 20, a valve mounted in the pipe 19 for supplying water to compensate for the leakage of water.

The method for controlling the operation of the fluid machine constructed as aforementioned when the machine is placed in spinning reserve condition will now be described. First, the inlet valve 17, the valve 20 for the supply of water to compensate for the leakage of water and the guide vane 2 are fully closed, the leakage water discharge valve 10 is opened, and compressed air is supplied to the runner chamber by actuating the air supply valve 8 so as to force down the water level in the runner chamber to a water level 6 in the draft tube 5 which is below the runner 1 in the runner chamber. Then, the runner 1 is rotated in compressed air atmosphere by the generator-motor or a starting motor (not shown). Since the inlet valve 17 and the valve 20 for the supply of water to compensate for the leakage water are fully closed, the pressure within the casing 3 is lowered due to the water leaking from the guide vane 2, and the water in the casing 3 is replaced by the air in the runner chamber, with the result that the water level in the casing 3 is gradually lowered until it reaches a level A, which is lower than the level of the guide vane 2. Thus the quantity of water leaking from the guide vane 2 is reduced to zero. Additionally, replacement of the water in the casing 3 by the air in the runner chamber causes the water level 6 below the runner to rise. Therefore, before the rising water level reaches the runner 1, the water level is detected by a water level detector (not shown) and the air supply valve 8 is opened so as to lower the water level again to a predetermined position. Inasmuch as the speed at which the water in the casing is replaced by the air in the runner chamber is low, compressed air can be supplied to the compressed air tank by continuously running a compressed air producing device (not shown), so that the compressed air required for forcing down the water level again to the predetermined position can be positively supplied.

Although the speed at which the casing 3 is filled with air and the quantity of water leaking from the guide vane 2 is reduced to zero is low, the time required for changing the water in the casing 3 for air is short as compared with the time during which the fluid machine remains in the spinning reserve condition. Accordingly, the period of time during which relatively high power is required to drive the runner 1 is shorter than that in fluid machines of the prior art. Also, a rise in the temperature in the runner chamber is lower than the corresponding rise in temperature in fluid machines of the prior art.

Adjustments of the time required for discharging water from the casing 3 can be effected by opening the valve 12 mounted in the pipe 11 for discharging water from the casing 3 which communicates with the draft tube 5 or opens in atmosphere.

When the fluid machine shifts from the spinning reserve condition to a power-generating or pumping-up operation, the valve 20 mounted in the pipe 19 for supplying water to compensate for the leakage of water and the valve 16 mounted in the line 15 for exhausting air from the casing 3 are opened so as to fill the casing 3 with water. Then the valve 14 mounted in the line 13 for exhausting air from the runner chamber is opened to raise the water level 6. Thereafter shifting of the fluid machine to a desired operation can be effected by a known method.

We claim:

1. A method for controlling the operation of a fluid machine in spinning reserve wherein the runner is rotated in compressed air atmosphere in the runner chamber for practicing a phase modifier operation or for producing a standby condition which permits immediate switchover to a power-generating or pumping-up operation, comprising the steps of:

providing a fluid machine having a runner rotatably mounted in a runner chamber in communication between a high pressure casing through closable guide vanes and a low pressure portion, with a valve between the high pressure casing and a high pressure portion;

closing the guide vanes and closing the valve between the high pressure casing and the high pressure portion; thereafter with the guide vanes closed and the valve closed, introducing compressed air into the runner chamber so as to force the water level in the runner chamber down so that the runner may spin in a compressed air atmosphere during reserve; thereafter, while the runner is spinning in reserve in the compressed air, discharging water from the casing and simultaneously introducing compressed air into the casing to take the place of the discharged water to lower the water level within the casing with respect to the guide vanes so as to substantially prevent leakage of water through the closed guide vanes from the casing into the runner chamber, whereby a spinning reserve condition may be obtained with a minimum quantity of compressed air to fill the runner chamber and thereafter the casing may be filled with compressed air to reduce leakage.

2. The method of claim 1, wherein said step of discharging water from the casing discharges water from the casing generally without passing through the runner.

3. The method of claim 1, including providing a compressed air inlet to said casing and a water outlet from said casing, each with controllable valves, and wherein said step of discharging water water from the casing and simultaneously introducing compressed air into the casing respectively discharge water and introduce compressed air through the controllable valves along paths independent of the guide vanes and independent of the rotor.

4. The method of claim 1, further including providing a discharge conduit with a controllable valve opening between the guide vanes and the runner, and wherein said step of discharging water from the casing discharges water as leakage through the guide vanes, the conduit and controllable valves substantially independently of the runner.

5. The method of claim 1, further including the steps of going from spinning reserve to operation: introducing water from the high pressure portion into the casing while simultaneously discharging compressed air from the casing and maintaining the guide vanes closed until the casing is substantially completely filled with water; thereafter discharging air from the runner chamber while simultaneously raising the level of the water within the runner chamber until the runner chamber is substantially completely filled with water, while maintaining the guide vanes closed; and thereafter opening the guide vanes.

* * * * *